(12) United States Patent
Gödeke et al.

(10) Patent No.: US 6,805,737 B2
(45) Date of Patent: Oct. 19, 2004

(54) LIGHTWEIGHT SUBSTANCE MOLDED BODY, METHOD FOR THE PRODUCTION AND USE THEREOF

(75) Inventors: Holger Gödeke, Achestetten (DE); Jürgen Werner, Stuttgart (DE); Gerhard Babuke, Wail der Stadt (DE)

(73) Assignees: Fraunhofer-Gesellschaft Zur Förderung Der Angewandten Forschung e.v. (DE); Gips-Schüle-Stiftung (DE)

(*) Notice: Subject to any disclaimer, the term of this patent is extended or adjusted under 35 U.S.C. 154(b) by 136 days.

(21) Appl. No.: 10/008,680

(22) Filed: Oct. 22, 2001

(65) Prior Publication Data

US 2002/0128142 A1 Sep. 12, 2002

Related U.S. Application Data

(63) Continuation of application No. 09/402,032, filed on Sep. 24, 1999, now abandoned.

(30) Foreign Application Priority Data

Mar. 26, 1997 (DE) .......................................... 197 12 835

(51) Int. Cl.⁷ .............................................. C04B 35/66
(52) U.S. Cl. ..................... 106/38.2; 106/38.3; 106/600; 252/62
(58) Field of Search ............................. 106/38.2, 38.3, 106/600; 252/62

(56) References Cited

U.S. PATENT DOCUMENTS

| | | | |
|---|---|---|---|
| 2,978,340 A | 4/1961 | Veatch et al. ................. 106/40 |
| 3,203,813 A | 8/1965 | Gajardo et al. ............... 106/40 |
| 3,658,564 A | 4/1972 | Gerow et al. ................. 106/84 |
| 3,718,491 A | 2/1973 | Yates .......................... 106/84 |
| 3,769,065 A | 10/1973 | Dunn ........................... 117/54 |
| 3,886,076 A | 5/1975 | Venable ........................ 252/62 |
| 4,288,253 A | 9/1981 | Venable ........................ 106/84 |
| 4,336,068 A | 6/1982 | Vogel et al. ................. 106/162 |
| 4,446,040 A | 5/1984 | Samanta ....................... 252/52 |
| 4,462,835 A * | 7/1984 | Car |
| 4,664,712 A | 5/1987 | Cisneros ...................... 106/84 |
| 4,802,921 A | 2/1989 | Motoki ..................... 106/18.12 |
| 5,076,986 A | 12/1991 | Delvaux et al. ............. 264/122 |
| 5,352,288 A | 10/1994 | Mallow ....................... 106/605 |
| 6,642,164 B2 * | 11/2003 | Akaishi ....................... 501/80 |

FOREIGN PATENT DOCUMENTS

| | | |
|---|---|---|
| DE | 2034449 | 1/1972 |
| DE | 2252488 | 5/1974 |
| DE | 2632084 | 1/1978 |
| DE | 3217260 | 2/1983 |
| DE | 3246502 | 6/1984 |
| DE | 3314145 | 10/1984 |
| DE | 19620600 | 11/1997 |
| EP | 0048570 | 3/1982 |
| EP | 0658528 | 6/1995 |
| GB | 2166 427 A | 5/1986 |
| JP | 0072018 | 6/1978 |
| JP | 54090323 | 7/1979 |
| JP | 01131084 | 5/1989 |
| JP | 01317148 | 12/1989 |
| JP | 9002881 | 1/1997 |
| JP | 9059077 | 3/1997 |
| SU | 463648 | 6/1975 |
| SU | 0889641 | 12/1981 |
| SU | 0990731 | 1/1983 |
| SU | 1020409 | 5/1983 |

* cited by examiner

*Primary Examiner*—Paul Marcantoni
(74) *Attorney, Agent, or Firm*—Young & Basile, P.C.

(57) ABSTRACT

The invention relates to a lightweight substance molded body made of a lightweight aggregate and a sintering auxiliary agent, wherein said molded body consist of a sintering product containing 60–95 wt. % lightweight aggregate with 40–5 wt. % water-soluble alkali silicate.

17 Claims, 3 Drawing Sheets

Schematic depiction of sintering of two lightweight aggregate particles.

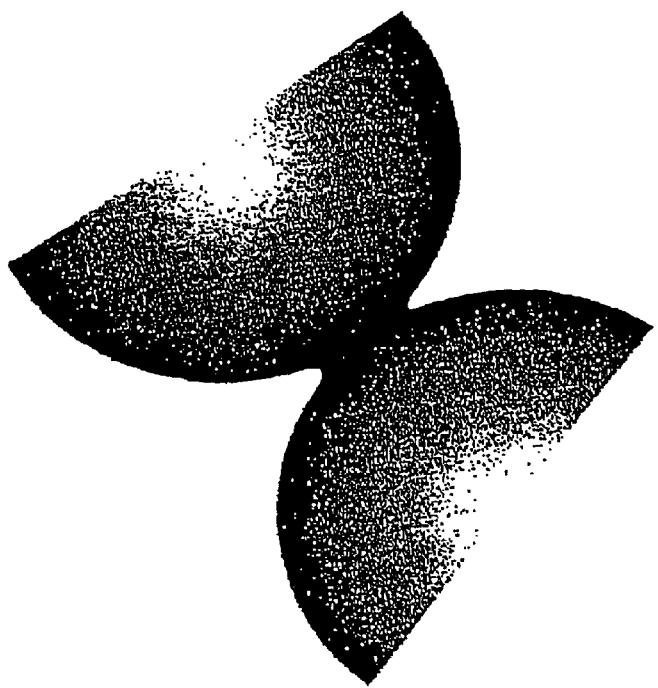
Figure 1. Schematic depiction of sintering of two lightweight aggregate particles.

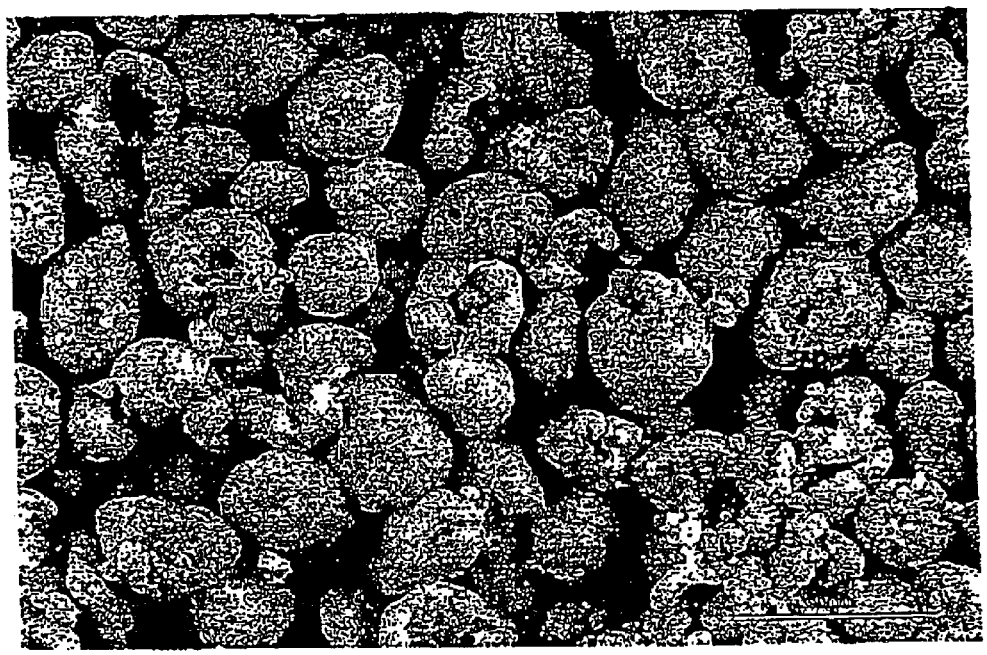
Figure 2. Sintered lightweight aggregate with open-pore structure.

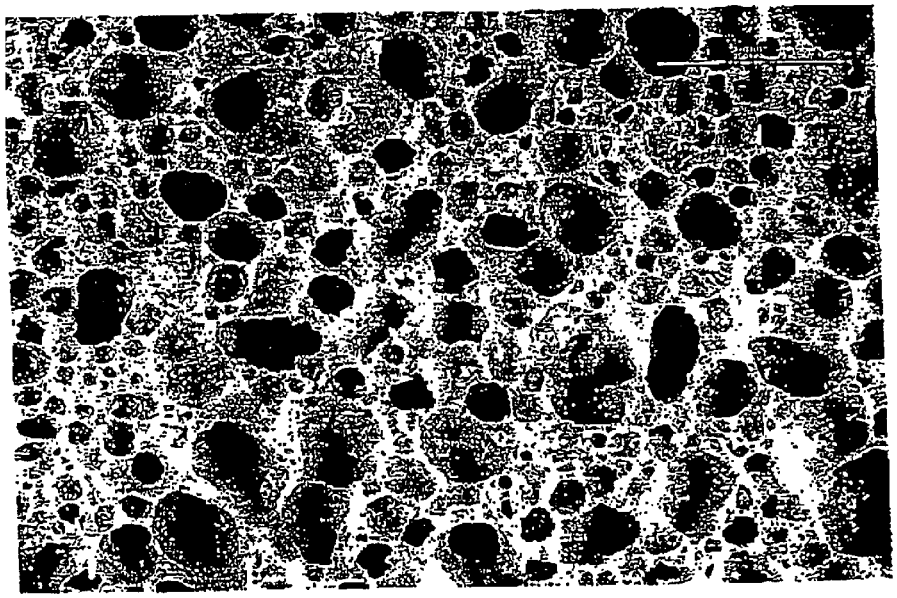
Figure 3. Sintered lightweight aggregate with closed-pore structure.

LIGHTWEIGHT SUBSTANCE MOLDED BODY, METHOD FOR THE PRODUCTION AND USE THEREOF

This application is a continuation of patent application Ser. No. 09/402,032, filed on Sep. 24, 1999 now abandoned.

The invention concerns a molded body made from a lightweight substance that contains a sintered product made from a lightweight aggregate and a water-soluble silicate. The invention also concerns a method for production of such molded bodies and their use.

Lightweight aggregate-containing products have been established for years in the construction sector. These materials are primarily used to reduce heat conductivity of construction products. The lightweight aggregates are incorporated, for example, in concrete (lightweight concrete), bricks or plaster systems. Mechanically loadable, nonflammable molded bodies whose heating properties are improved relative to the pure matrix material can be produced with these inorganic matrix materials, Lightweight aggregates, for example, perlites with water glass, bonded into insulating panels are used, especially in the United States, in household appliances (coffee machines). The products have limited compressive strength ($O_D$<0.5 N/mm²) and are not waterproof Water glass is often used as a binder in the production of lightweight aggregates (expanded glass), in which the binder is required to produce the crude granulate (EPOS 084 634). These products are used in plaster and mortar systems. The use of water glass as a binder or fire retardant for lightweight insulation plates made of paper or scrap paper is known from the documents DE 41 14 755 A1, DE 44 32 019 A1 and DE 44 36 981 A1. The production of fireproof, radiation-shielding lightweight plates and molded parts is described in DE 33 03 204. The method is characterized by the fact that the employed mineral fillers, perlites or expanded shales, kaolin and if necessary mineral fibers, curing agents and water glass, that contains an expanding agent as a binder are homogenized at room temperature during foaming of the water glass in a mixer, then extruded into molded bodies and dried at a temperature of about 150° C. These systems are also characterized by insufficient water resistance.

The production of ceramic products from clay, kaolin, quartz flour, feldspar or other fluxes, talc and basic raw materials (not further specified) is explained in DE 37 22 242 C1. A mass that is made castable by means of a plasticizer is mixed with less than 1 wt. % water glass and curing agent, dried and fired. In this process water glass is added as plasticizer and for the solidification of the casting mass after shaping, whereby an absorbent mold material, like gypsum, for example, can be eliminated. Ordinary pore-forming agents, like perlites, cenospheres, expanded clay, pumice or kieselguhr are used for pore formation. The dried products are subjected to ceramic firing with a firing temperature of about 1200° C., in which the initial components clay, kaolin, feldspar and quartz form the ceramic body material. Thus, the addition of water glass occurs exclusively for the plasticization and for the solidification of the casting mass in the subsequent processing step.

Thus, a disadvantage in conventional molded bodies or construction products that contain lightweight aggregates is especially the fact that a drastic reduction in strength occurs when the content of aggregate is increased. The conventional molded bodies or construction products are therefore only conditionally suited for insulation molded bodies, bricks or the like.

From here, the task of the present invention is to propose a molded body that is essentially inorganic in nature and is simultaneously characterized by low density, good water and acid resistance and high mechanical strength. Another task of the present invention is to provide a corresponding process for production of such molded bodies, as well as their use.

It is therefore proposed according to the invention that the molded body be essentially formed from a sintered product containing 60 to 95 wt. % of a lightweight aggregate with 40 to 5 wt. % of a water-soluble silicate. The nonflammable inorganic molded bodies according to the invention are characterized, in particular, by low density, good water and acid resistance, and by comparatively high mechanical strength at the same time. This can be obviously attributed to the fact that the aggregates are sintered together, by which a network is formed between the aggregates that is characterized by high binding forces. Because of this, the properties of the aggregates can essentially be retained as such. Owing to the fact that the sintering auxiliary itself is formed from the water-soluble silicate glass, a pure inorganic molded body is involved. It is significant here that the water-soluble silicate glass fulfills several tasks. On the one hand, it serves for dust removal of the aggregate and as its temporary binder during production of the green body. Simultaneously, the water-soluble silicate functions as a pore-forming agent. However, it is important that the water-soluble silicate glass act as sintering auxiliary. By the use of water-soluble silicates the formation of a liquid phase whose softening point is lower than the softening point of the aggregate is possible during the sintering process. The lightweight aggregates can therefore be sintered together without disturbing their pore structure. Using a minimal content of silicate, a no-fines structure is therefore formed in which the aggregates are sintered together exclusively at the contact site.

It is also possible on this account for the molded body according to the invention to have an extremely high percentage of aggregate (60 to 95 wt. %, preferably 80 to 93 wt. %). This ensures that the properties of the molded body are essentially dictated by the nature of the lightweight aggregate itself.

It is also emphasized in the molded bodies according to the invention that their properties can be varied over a wide range by selecting the lightweight aggregate and the sintering conditions. It is thus possible to produce molded bodies whose dry bulk density lies in the range of 150 to 750 kg/m³. Choice of the corresponding dry bulk density is then made according to the application. The compressive strength of the molded body according to the invention lies in the range of 0.1 to 15 N/mm².

The molded body according to the invention from a material standpoint can be produced from any silicate lightweight aggregate known from prior art. However, scrap glass, expanded glass, perlites, vermiculites, expanded clay, cenospheres, kieselguhr or natural and metallurgical pumice are preferred as aggregate.

Alkali silicates, preferably water glass, especially sodium water glass and potassium water glass, are preferred among the water-soluble silicates. Water glass is soluble in alkaline solutions and water, in contrast to standard glass, like container glass. This solubility, among other things, is due to the fact that alkali ions are incorporated in their network, which reduce chemical resistance. Since most inorganic lightweight aggregates (e.g., expanded glass granulate, expanded clay, perlites, etc.) also incorporate alkaline earth oxides, a soda-lime glass can be formed from the water glass during liquid phase sintering, which is required to produce the molded body, wherein good water resistance is produced.

The invention also concerns a process for production of the molded bodies just described.

To produce a molded body according to the invention, it is merely essential to mix the lightweight aggregate and the sintering auxiliary and to sinter them after a shaping process at 400 to 1000° C. over a period of 0.1 to 5 h. It is essential in the object of the application that the properties of the molded body, like compressive strength and dry bulk density, heat conductivity, flow resistance and sound absorption, can be influenced by varying the process parameters, i.e., the sintering conditions.

It has proven advantageous if separate drying is conducted at 50 to 95° C. after shaping and before sintering. Preferred process parameters for the sintering process are 550 to 850° C. and a sintering time of 0.1 to 0.5 h.

Production of a molded body is further described below.

The lightweight aggregate is mixed with the sintering auxiliary using an intensive mixer, for example, a plow blade mixer or countercurrent mixer, in which the sintering auxiliary is preferably sprayed into the mixing chamber of the mixer. Depending on the type of lightweight aggregate used and the pore structure to be achieved, 5 to 40% water-soluble alkali or alkaline earth silicates are added as sintering auxiliary. The obtained mixture is filled into molds for shaping, vibrated or compacted by single, biaxial or isostatic pressing. Compaction by extrusion of the plastic molding compound is also possible. During the drying process that occurs after shaping (drying temperature about 90° C.), the alkali silicates condense to form a water-soluble silicate framework. This process can be accelerated by the addition of corresponding curing agents, like aluminum phosphates. The green bodies so produced are sintered in a subsequent temperature treatment, in which the individual lightweight aggregate particles are sintered together at temperatures between 550 and 900° C. This liquid phase sintering process decidedly dictates the pore structure. Through variation of the porosity, the pore size distribution and the type of pores, the construction physical properties, like the sound absorption capacity or the heat conductivity, for example, as, well as strength, can be varied. Components within a bulk density range of 150 to 750 $kg/m^3$ can be produced with a heating rate of about 30 min at the maximum sintering temperature. Machining by sawing, grinding or drilling can occur either before or after the sintering process.

The following influencing parameters can be varied to form the structure:

- type of lightweight aggregate
- particle size distribution of lightweight aggregate
- type and amount of sintering auxiliary
- precompaction during shaping
- sintering process The major advantage of the process according to the invention is therefore seen in the fact that molded bodies for different applications can be produced by the significant variation possibilities, both with respect to aggregate and process parameters. Owing to the formation of the inorganic network in the molded body itself, which is determined by the lightweight aggregate, the molded bodies are particularly suited for use as insulation molded bodies. Such pressure-loadable insulation molded bodies consist of pure inorganic fiber-free materials, which can be machined; for example, by sawing and drilling. They therefore combine the advantages of inorganic products such as nonflammability, resistance to rotting, etc. with the application and processing advantages of hard foams based on PU or PS. As a result, these products open up broad fields of application in the area of heat insulation, cold insulation, fireproofing and acoustics. Molded bodies containing lightweight aggregate whose mechanical properties are comparable to ordinary bricks with simultaneously improved heat properties can be achieved by the liquid phase sintering process. It is therefore possible for the material according to the invention to form a one-shell, monolithic, high-heat-insulating masonry without having to tolerate an additional increase in masonry work.

The material structure, primarily the density and porosity, can be varied by a variation of the process parameters and appropriate selection of the lightweight aggregate. Thus, highly porous bricks without a load-bearing function for components of frameworks can be produced without having to tolerate the disadvantage of additional entry of moisture, as is known in cellular concrete. If the aforementioned parameters are varied so that the mechanical properties, say, compressive strength, are primarily increased, pressure-loadable insulation materials are produced for engineering construction, for example, support elements, struts. Owing to the inorganic structure and flexible shaping possibilities by pressing, casting, machining, etc., heat-insulating fireproof elements with different geometries can be produced. These advantages could also be expedient for production of exhaust systems in household or industrial furnace units. If lightweight aggregates with a high glass transition point, as well as alkali silicates adjusted accordingly to them; are used, it is possible to produce kiln furniture or even fireproof furnace linings.

Since the existing open porosity of the lightweight aggregate charges is largely retained, their sound-absorbing properties are also not adversely affected. The quantities that influence sound absorption in frequency-dependent fashion (flow resistance, porosity and structure factor) can be adjusted by variation of the particle size, temperature and compaction during production. Significant strength, edge stability, construction material class Al, environmental neutrality and simple manufacture, shaping and processing are attainable by the sintering process. Preferably, these sound-absorbing materials are used to produce sound-absorbing components, like wall and ceiling elements, baffles, sound-damping connection elements, segments for fixed passage-ways of rail vehicles, as well as molded bodies in exhaust lines.

Large-format inorganic insulation boards with limited heat conductivity of 0.06 W/mK, which can be used, for example, as plaster support boards, are produced using lightweight aggregates with very low heat conductivity; for example, expanded perlite.

Because of the inorganic structure of these insulators, coupled with the high temperature resistance, such products are also suitable for technical fireproofing, for example, in fireproof doors.

Since an open-pore structure with defined diameter can be achieved with the production process according to the invention, filter elements or catalyst support materials for chemical technology can also be tailor-made.

The invention is further explained below with reference to three figures and several embodiment examples.

FIG. 1 schematically depicts sintering of two lightweight aggregate particles.

The formation of a sintered neck between the lightweight aggregate particles is readily apparent from FIG. 1.

FIG. 2 also schematically depicts an open-pore structure of a sintered lightweight aggregate.

The structure depicted in FIG. 2 has a density of 300 $kg/m^3$. The formation of an open-pore network is readily apparent from FIG. 2.

FIG. 3 shows, in contrast to FIG. 2, a closed-pore structure with a density of 500 $kg/m^3$.

Comparison of FIG. 2 and FIG. 3 clearly shows that it is possible to vary the properties of a molded body over a wide range with the production process according to the invention by selecting the aggregates and especially the sintering conditions.

The following examples further explain the invention:

EXAMPLE 1

92 parts by weight of expanded glass granulate from scrap glass (Poraver, 1 to 2 mm) are mixed with 8 parts by weight of sodium tetrasilicate dissolved in water (molar modulus 4.0) in a plow blade mixer. The mixture so obtained is filled into molds and axially compacted with a pressure of about 2 bar. After completion of drying (80° C./8 h), sintering occurs at 720° C. in an oxidizing atmosphere. The material so produced has a no-fines structure with a bulk density of about 400 kg/m³, which is characterized in particular by a high degree of absorption ($\alpha>0.8$ at 500 to 1000 Hz), coupled with high compression strength of about 3.5 MPa. The acid-resistant, water-resistant and freeze-thaw cycle resistant material is best suited for use as a nonflammable sound absorbent, as used in many vehicle installations, for example, passageway linings for rail vehicles. Because of the acid resistance (neither weight nor strength loss due to acid attack after 24 h at 95° C. with 70% $H_2SO_4$) such fiber-free, nonflammable absorbent materials are also pre-destined for use as sound absorbers for furnace installations, for example, in power plants.

EXAMPLE 2

85 parts by weight of thermally expanded perlite are mixed with 15 parts by weight of sodium disilicate dissolved in water (molar modulus 2.0) in a plow blade mixer so that damage to the lightweight aggregate does not occur. Using a pressure of 0.5 bar and a drying temperature of 80° C., green bodies are obtained that have a low bulk density of about 200 kg/m³ after sintering at 740° C. in an oxidizing atmosphere. This light, water-resistant, no-fines material has a high degree of sound absorption ($\alpha>0.8$ at 500 to 1000 Hz), for which reason it can primarily be used for acoustic boards, baffles, i.e., products that are suspended from ceilings.

92 wt. % [sic] of Liaver lightweight aggregate is mixed with 8 parts by weight sodium tetrasilicate dissolved in water (molar modulus 4.0) in an intensive mixer and compacted with a pressure of 2 bar. After sintering at 780° C. absorber materials are formed that can be used up to a temperature of 700° C. As a result, these products are usable for sound absorbers of vehicles, and can withstand temperature loads up to about 700° C. and therefore represent an alternative to the mineral fiber-containing absorbers that have been used until now and that are suspected of being carcinogenic according to TRGS 905.

EXAMPLE 3

92 parts by weight expanded glass (Mizziglas, Mizzi AG) are mixed with 8 parts by weight sodium tetrasilicate dissolved in water (molar modulus 4.0) and compacted with a pressure of 5 bar. With a sintering temperature of 850° C. a pressure-loaded insulation material with a closed-pore structure is formed. These products with a bulk density of about 500 kg/m³ have a mostly closed-cell structure, which leads to high compressive strength of 10 MPa. At the same time, heat conductivities of 0.13 W/mK are achieved. These construction materials are primarily suited to produce pressure-loadable, heat-insulating components, for example, support elements, as used in the production of balconies or verandas.

EXAMPLE 4

91 parts by weight of expanded glass granulate (Poraver, 1 to 2) are mixed with 9 parts by weight sodium water glass and filled into molds. Shaping occurs by an axial pressing process with a pressure of 0.4 bar. In conjunction with drying at 80° C., sintering occurs at 760° C. in air. The material so produced has a bulk density of about 300 kg/m³, so that a heat conductivity $\lambda$ of 0.078 W/mK and a compressive strength of about 1 MPa are obtained. Areas in which the insulation must assume no load-bearing function, like parts of wood scaffolding structures, frameworks, etc., represent an ideal area of application for such materials.

What is claimed is:

1. A molded body from a lightweight substance formed from a lightweight aggregate and a sintering auxiliary, comprising:
   a sintered product obtained by mixing a lightweight substance of 80 to 93 wt % of a lightweight aggregate, selected from the group consisting of expanded glass, scrap glass, and their mixtures with 20 to 7 wt % of an aqueous alkali silicate solution, where the lightweight aggregate is bonded in a network structure exclusively at the contact sites to obtain its essential properties, wherein the molded body has a dry bulk density and that dry bulk density lies in the range from 150 to 750 kg/m³.
2. Molded body according to claim 1 further comprising that the molded body has a compressive strength and that the compressive strength lies in the range from 0.1 to 15 N/mm².
3. Molded body according to claim 1 wherein the aqueous alkali silicate solution is alkali silicates.
4. The molded body according to claim 1, wherein the molded body is used as insulation.
5. The molded body according to claim 1, wherein the molded body is used as construction material.
6. The molded body according to claim 1, wherein the molded body is used as furnace lining.
7. The molded body according to claim 1, wherein the molded body is used as a brick for formation of exhaust installation.
8. The molded body according to claim 1, wherein the molded body is used for technical sound protection in interior rooms.
9. The molded body according to claim 1, wherein the molded body is used for a sound-absorbing segment for fixed passageways of rail vehicles.
10. The molded body according to claim 1, wherein the molded body is used as a fireproofing element.
11. The molded body according to claim 1, wherein the molded body is used as a sound absorber in exhaust lines.
12. A process for the production of a molded body from a lightweight substance formed from a lightweight aggregate and a sintering auxiliary, the process comprising the steps of:
    obtaining a sintered product by mixing a lightweight substance of 80 to 93 wt % of a lightweight aggregate selected form the group consisting of expanded glass, scrap glass, and their mixtures with 20 to 7 wt % of an aqueous alkali silicate solution, where the lightweight aggregate is bonded in a network structure exclusively at the contact sites to obtain its essential properties, wherein the molded body has a dry bulk density and that dry bulk density lies in the range from 150 to 750 kg/m³.
13. Process for the production of a molded body according to claim 12 further comprising the steps of:
    subjecting the lightweight aggregate and the aqueous alkali silicate solution to a shaping process after mixing and sintering at 400° C. to 1000° C. over a period from 0.1 h to 5 h.
14. Process according to claim 13, wherein the molded body has a compressive strength in the range from 0.1 to 15 N/mm³ and at least one of the dry bulk density and the compressive strength is adjusted as a function of the lightweight aggregate and the process parameters during sintering.
15. Process according to claim 13 further comprising the step of drying at 50° C. to 95° C. after shaping and before sintering.
16. Process according to claim 13 wherein the sintering process is conducted at 550 to 850° C.
17. Process according to claim 13 wherein sintering occurs during a period from 0.1 h to 0.5 h.

* * * * *